US009136988B2

(12) United States Patent
Park et al.

(10) Patent No.: US 9,136,988 B2
(45) Date of Patent: Sep. 15, 2015

(54) METHOD OF TRANSMITTING DATA TO MITIGATE INTERFERENCE

(75) Inventors: Hyung Ho Park, Anyang-si (KR); Min Seok Oh, Anyang-si (KR); Doo Hyun Seong, Anyang-si (KR); Jin Soo Choi, Anyang-si (KR); Jae Hoon Chung, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 684 days.

(21) Appl. No.: 12/449,154

(22) PCT Filed: Jan. 25, 2008

(86) PCT No.: PCT/KR2008/000483
§ 371 (c)(1),
(2), (4) Date: Jul. 24, 2009

(87) PCT Pub. No.: WO2008/093968
PCT Pub. Date: Aug. 7, 2008

(65) Prior Publication Data
US 2010/0091902 A1    Apr. 15, 2010

Related U.S. Application Data

(60) Provisional application No. 60/887,789, filed on Feb. 1, 2007.

(30) Foreign Application Priority Data

Mar. 19, 2007 (KR) .................. 10-2007-0026601

(51) Int. Cl.
*H04L 27/00* (2006.01)
*H04L 1/18* (2006.01)

(52) U.S. Cl.
CPC ............. *H04L 1/1893* (2013.01); *H04L 1/1812* (2013.01)

(58) Field of Classification Search
None
See application file for complete search history.

(56) References Cited

U.S. PATENT DOCUMENTS

| | | | |
|---|---|---|---|
| 2003/0202563 A1* | 10/2003 | Das et al. | 375/146 |
| 2004/0160921 A1* | 8/2004 | Kaipainen et al. | 370/335 |
| 2004/0199846 A1* | 10/2004 | Matsumoto et al. | 714/748 |
| 2005/0108610 A1* | 5/2005 | Kim et al. | 714/748 |
| 2006/0036922 A1* | 2/2006 | Hong et al. | 714/748 |
| 2006/0291579 A1* | 12/2006 | Duan et al. | 375/264 |
| 2010/0211842 A1* | 8/2010 | Moon et al. | 714/748 |
| 2012/0002558 A1* | 1/2012 | Swartzentruber et al. | 370/252 |
| 2013/0034291 A1* | 2/2013 | Minin et al. | 382/137 |

OTHER PUBLICATIONS

Hong Chen, Pingzhi Fan: "An adaptive coded modulation scheme associated with improved HARQ." In: Personal.Indoor and Mobile Radio Communication, 2003. PIMRC 2003. 14$^{th}$ IEEE Proceedings on vol. 2, Sep. 7-10, 2003 pp. 1292-1296, Digital Object Identifier 10.1109/PIMRC.2003.1260321.

(Continued)

*Primary Examiner* — Shuwang Liu
*Assistant Examiner* — Gina McKie
(74) *Attorney, Agent, or Firm* — Dentons US LLP

(57) ABSTRACT

A method of transmitting data using hybrid automatic repeat request (HARQ) is provided. The method includes transmitting an initial data, receiving a retransmission request for the initial data, generating a retransmission data by shifting the phase of the initial data on signal constellation and transmitting the retransmission data. Inter-cell interference or intra-cell interference can be mitigated.

2 Claims, 18 Drawing Sheets

(56) References Cited

OTHER PUBLICATIONS

Dottling, M.; Michel, J.; Raaf, B.: "Hybrid ARQ and adaptive modulation and coding schemes for high speed downlink packet access." In: Personal, Indoor and Mobile Radio Communications, 2002. The 13$^{th}$ IEEE International Symposium on vol. 3, Sep. 15-18, 2002 pp. 1073-1077.

H. Chen et al. "An Adaptive Coded Modulation Scheme Associated with Improved HARQ", IEEE PIMRC 2003, Sep. 7, 2003.
M. Dottling et al. "Hybrid ARQ and Adaptive Modulation and Coding Scheme for High Speed Downlink Packet Access", IEEE PIMRC 2002, Sep. 15, 2002.

* cited by examiner

METHOD OF TRANSMITTING DATA TO MITIGATE INTERFERENCE

This application is a 371 national stage entry of International Application No. PCT/KR2008/000483, filed Jan. 25, 2008, and claims priority to U.S. Provisional Patent Application No. 60/887,789, filed Feb. 1, 2007, and Korean Patent Application No. 10-2007-0026601, filed in the Republic of Korea on Mar. 19, 2007, the contents of each of the above-identified applications is incorporated by reference herein in their entireties.

TECHNICAL FIELD

The present invention relates to wireless communication, and more specifically, to a method of transmitting data to mitigate interference occurred by other users in wireless communication.

BACKGROUND ART

Owing to generalization of information communication services, the demands for various communication services are rapidly increased such as multimedia services, high quality services, and the like. Researches on variety of wireless communication techniques in various fields are in progress to satisfy such demands.

One technique of securing reliability of communication is to obtain diversity gain by repeatedly transmitting the same data. By transmitting same data through multiple paths, data can reliably be reconstructed since data through some path can be reliable although data through the other paths are erroneous. An advantage of the diversity is to stably transmit and/or receive data through multiple paths independent of each other. Examples of the diversity technique include frequency diversity, time diversity and spatial diversity. The spatial diversity employs multiple transmit antennas.

Another technique of securing reliability of communication is hybrid automatic repeat request (HARQ) which combines forward error correction (FEC) and automatic repeat request (ARQ). The HARQ enhances the reliability by re-transmitting data when the data include decodable errors. An example of the HARQ is disclosed in D. Chase, Code Combining: A maximum-likelihood decoding approach for combining an arbitrary number of noisy packets, IEEE Trans. on Commun., Vol. 33, pp. 593-607, May, 1985.

Generally, a base station provides services for one or more cells. The base station can provide services to a plurality of users. In a service from the base station to a user or a service from a user to the base station, a service for another user can be considered as interference. Interference generated by a user located in another cell is referred to as inter-cell interference, and interference generated by a user located in the same cell is referred to as intra-cell interference.

In diversity or HARQ, link performance can be deteriorated due to the inter-cell interference or intra-cell interference. A method is sought for mitigating interference generated by other users.

DISCLOSURE OF INVENTION

Technical Problem

An object of the invention is to provide a method for mitigating inter-cell interference or intra-cell interference occurred by other users.

Another object of the invention is to provide a method for enhancing frequency selectivity.

Technical Solution

In an aspect, a method of transmitting data using hybrid automatic repeat request (HARQ) is provided. The method includes transmitting an initial data, receiving a retransmission request for the initial data, generating a retransmission data by shifting the phase of the initial data on signal constellation and transmitting the retransmission data.

In another aspect, a method of transmitting data includes preparing a first bit stream, generating a second bit stream by bit masking the first bit stream using a bit mask pattern to shift the phase of the first bit stream and transmitting the second bit stream.

Advantageous Effects

By mitigating inter-cell interference or intra-cell interference, gain can be obtained in single transmission or retransmission. Residual ISI can be canceled in single transmission or retransmission. Since complexity is as low as to be negligible, it is easy to implement. Diversity gain based on channel selectivity can be obtained by adjusting the channel selectivity.

MODE FOR THE INVENTION

The present invention disclosed herein can be used for a variety of communication systems. A communication system is widely deployed to provide a variety of communication services such as voices, packet data, and the like. This technique can be used for downlink or uplink. Generally, downlink means a communication from a base station (BS) to a user equipment (UE), and uplink means a communication from the user equipment to the base station. The base station generally is a fixed station that communicates with the user equipment and can be referred to as another terminology, such as a node-B, base transceiver system (BTS), access point, or the like. The user equipment can be fixed or mobile and can be referred to as another terminology, such as a mobile station (MS), user terminal (UT), subscriber station (SS), wireless device, or the like.

The communication system may be a multiple-input multiple-output (MIMO) system, multiple-input single-output (MISO) system, single-input single-output (SISO) system, or single-input multiple-output (SIMO). The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas.

Figure 1:
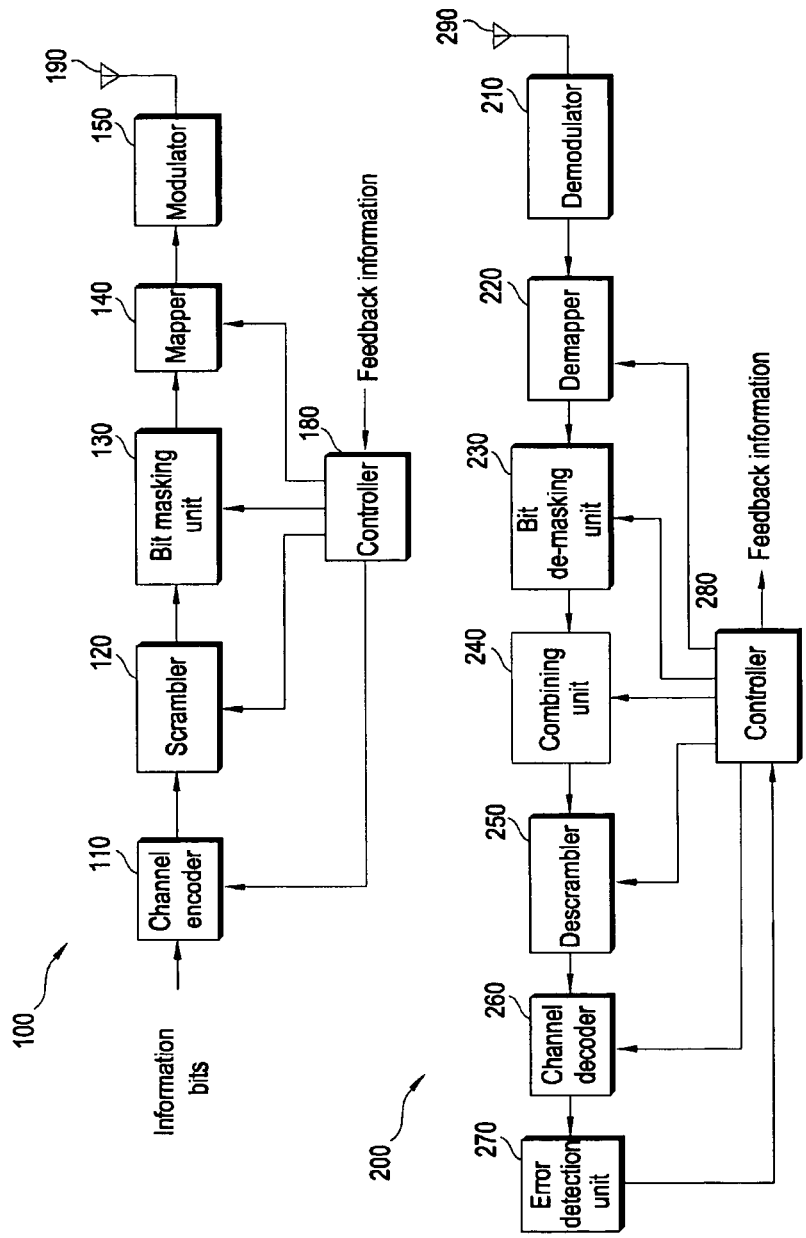
FIG. 1 is a block diagram showing a wireless communication system according to an embodiment of the invention.

FIG. 1 is a block diagram showing a wireless communication system according to an embodiment of the invention;

Referring to FIG. 1, a wireless communication system comprises a transmitter 100 and a receiver 200. The wireless communication system can use Hybrid Automatic Repeat Request (HARQ) scheme. Here, the transmitter 100 and the receiver 200 can be referred to as a transceiver for performing both of transmission functions and receiving functions. For clarity, hereinafter, one side in charge of data transmission or retransmission is referred to as the transmitter 100, and the other side for receiving the data and requesting retransmission is referred to as the receiver 200.

In downlink direction, the transmitter 100 can be a part of the base station, and the receiver 200 can be a part of the user equipment. In uplink direction, the transmitter 100 can be a part of the user equipment, and the receiver 200 can be a part of the base station. The base station may include a plurality of receivers and transmitters. The user equipment may include a plurality of receivers and transmitters.

The transmitter 100 includes a channel encoder 110, a scrambler 120, a bit making unit 130, a mapper 140, and a controller 180.

The channel encoder 110 receives a series of information bits and encodes the information bits to generate coded data. The encoding scheme is not limited, and a convolutional code, a turbo code, or the like can be used.

The scrambler 120 scrambles the coded data and generates a scrambled code. The scrambler 120 applies a scrambling code to the coded data and generates the scrambled code. The scrambling code is a code allocated to each user (or base station) in order to distinguish a user (or base station) from others when the user (or base station) shares the same radio resources. The scrambling code can be referred to as a user specific code for distinguishing a user, or a base station specific code for distinguishing a base station. Cods arrays having outstanding characteristics of auto-correlation or cross-correlation, such as a pseudo noise (PN) code, constant amplitude zero auto-correlation sequence (CAZAC) sequence, random sequence, Walsh-Hadamard code, maximum length sequence, and the like which are well-known in the art, can be generally used as a scrambling code.

The bit masking unit 130 performs bit masking for the scrambled code using a bit mask pattern and shifts the phase of the scrambled code. The bit masking is performing a bitwise operation using the bit mask pattern. The bit mask pattern includes at least one or more bit patterns, and its size can be varied by constellation size. The bit masking unit 130 can shift a phase on the constellation by recombining the scrambled code considering the constellation corresponding to a modulation scheme.

The mapper 140 maps the bit masked data to a data symbol over signal constellation. The modulation scheme performed in the mapper 140 is not limited and can be M-phase shift keying (M-PSK) or M-quadrature amplitude modulation (M-QAM). For example, the M-PSK can be binary PSK (BPSK), quadrature PSK (QPSK), or 8-PSK. The M-QAM can be 16-QAM, 64-QAM, or 256-QAM The modulator 150 modulates the data symbol. The modulated signal is transmitted through a transmit antenna 190.

The controller 180 controls the overall operation of the transmitter 100 through feedback information. The feedback information may include channel quality information (CQI). The controller 180 can adaptively adjust a modulation and coding scheme (MCS) by using the CQI. The feedback information may include retransmission request information, and the controller 150 can shift the phase of the scrambled code by changing a bit mask pattern of the bit masking unit 130 based on the retransmission request information.

The receiver includes a demodulator 210, a bit de-masking unit 230, a descrambler 250, a channel decoder 260, and an error detection unit 270.

A signal received through a receive antenna 290 is demodulated by the demodulator 210 and inputted into the demapper 220. The demapper 220 demaps the input signal based on a demapping control signal provided by the controller 280. The demapping control signal is based on the modulation scheme of the mapper 140 of the transmitter 100. The demapping control signal can be previously stored in memory of the controller 280. Alternatively, demapping control signal can be received from the transmitter 100. The bit de-masking unit 230 performs an inverse operation of the bit masking unit 130.

The receiver 200 may include a combining unit 240 for combining a retransmitted symbol with a previous symbol. In the case of chase combining or a HARQ method of incremental redundancy (IR), the combining unit 240 combines a previous symbol with a retransmitted symbol. An equal-gain combining method that assigns the same weight to previous data and retransmitted data and combines the data through an average value can be used as a combining method. Alternatively, a maximal ratio combining (MRC) method that assigns a different weight to each of the data can be used. The combining method is not limited, and other various methods can be used. However, the present inventive concept is not limited to the chase combining or IR method, but can be applied as is to the HARQ method, which performs channel decoding only through a retransmitted symbol, without combining the retransmitted symbol with a previous symbol. In this case, the combining unit 240 can be excluded from the receiver, which is shown as a dotted line.

The descrambler 250 extracts a scrambling code from the scrambled code and outputs coded data. The channel decoder 260 decodes the coded data. The error detection unit 270 detects whether any error is detected in the decoded data through a cyclic redundancy check (CRC) or the like.

The controller 280 controls the overall operation of the receiver 200 and provides feedback information to the transmitter 100. The controller 280 receives detection of error from the error detection unit 270 and determines whether to request retransmission. The controller 280 can feed back a positive acknowledgement (ACK) signal if an error is not detected or a negative acknowledgement (NACK) signal if an error is detected. The NACK signal can be a retransmission request signal. The controller 280 measures channel quality from the received signal and may provide CQI information.

Figure 2:
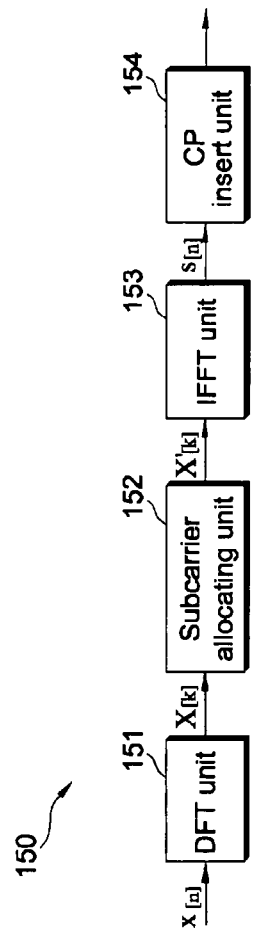
FIG. 2 is a block diagram for a modulator.

FIG. 2 is a block diagram for a modulator.

Referring to FIG. 2, a modulator 150 includes a discrete Fourier transform (DFT) unit 151, a subcarrier allocating unit 152, an inverse fast Fourier transform (IFFT) unit 153, and a cyclic prefix (CP) insert unit 154.

The DFT unit 151 performs DFT on input signal x[n] to transform the input signal into frequency domain signal X[k] as shown MathFigure 1

$$X[k] = DFT\{x[n]\} \quad\quad\quad \text{[Math. 1]}$$
$$= \sum_{n=0}^{L-1} x[n]\exp\left(\frac{-2j\pi nk}{L}\right)$$

where L denotes DFT size.

The subcarrier allocating unit 152 allocates frequency a domain signal X[k] to sub-carriers. Local mapping or distributed mapping can be used. The IFFT unit 153 performs IFFT on the signal X'[k] allocated by the subcarrier allocating unit 152 to transform the signal X'[k] into a time domain signal s[n]. The CP insert unit inserts a CP into the time domain signal s[n]. The CP-inserted signal is called as OFDM (Orthogonal Frequency Division Multiplexing) symbol.

The modulator 150 implements single carrier-frequency division multiple access (SC-FDMA). However, the multiple access modulation scheme to which the present invention is applied is not limited, and a well-known single-carrier modulation scheme, such as time division multiple access (TDMA), frequency division multiple access (FDMA), or code division multiple access (CDMA), or a multiple-carrier modulation scheme such as orthogonal frequency division multiple access (OFDMA) can be employed.

Figure 3:
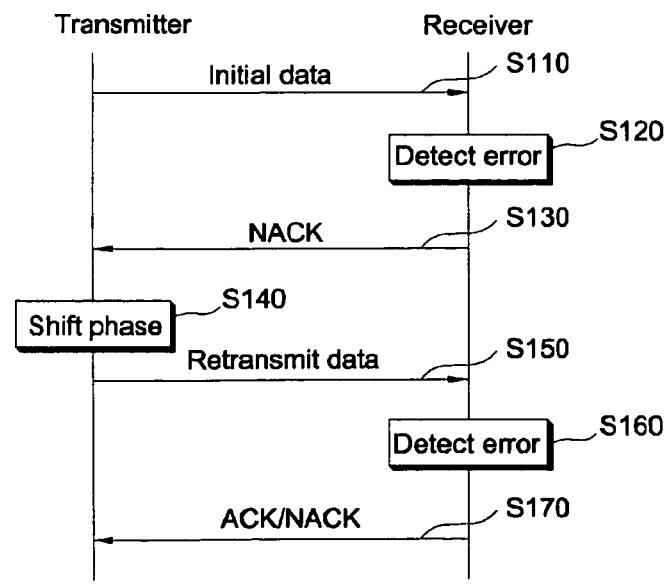
FIG. 3 is a flowchart illustrating a data transmission method according to an embodiment of the invention.

FIG. 3 is a flowchart illustrating a data transmission method according to an embodiment of the invention.

Referring to FIG. 3, a transmitter transmits initial data at step S110. The initial data can be a scrambled code. A receiver descrambles and decodes the received signal and detects an error at step S120. If the receiver does not detect an error, it transmits an ACK signal to the transmitter and waits for transmission of the next data. However, it is assumed here that the receiver detects an error and transmits a NACK signal as a retransmission request signal at step S130.

If the NACK signal is received, the transmitter generates phase shifted retransmission data by performing bit masking on the initial data S140. Using a bit mask pattern determined by a modulation scheme or a degree of phase shift, the initial data is bit masked. The bit masked data is transformed into retransmission data whose phase on signal constellation is shifted compared with the initial data while passing through constellation mapping. A value of the phase shift is not limited, but for example, the phase of the retransmission data can be shifted as much as π radians compared with the phase of the initial data.

The transmitter transmits the retransmission data to the receiver at step S150. The receiver detects an error in the retransmitted data at step S160. The receiver transmits an ACK signal or a NACK signal to the transmitter depending on detection of an error at step S170.

Although it is assumed that the retransmission is attempted once, retransmission can be performed at least one or more times. Retransmission can be performed as many times as a predetermined number or performed based on a predetermined criterion.

A transmitter can shift the phase of initial data through bit masking whenever the data is retransmitted. A value of the phase shift can be different in each retransmission or can be the same in all retransmissions. The value of the phase shift can be a value that is known to both the receiver and the transmitter. The value of the phase shift can be determined by the receiver and informed to the transmitter. Alternatively, since the phase shift is varied depending on a bit mask pattern, the bit mask pattern can be previously known between the receiver and the transmitter. A bit mask pattern to be used can be determined by the receiver and informed to the transmitter.

The transmitter transmits the retransmission data to the receiver at step S150. The receiver detects an error in the retransmitted data at step S160. The receiver transmits an ACK signal or a NACK signal to the transmitter depending on detection of an error at step S170.

Although it is assumed that the retransmission is attempted once, retransmission can be performed at least one or more times. Retransmission can be performed as many times as a predetermined number or performed based on a predetermined criterion.

A transmitter can shift the phase of initial data through bit masking whenever the data is retransmitted. A value of the phase shift can be different in each retransmission or can be the same in all retransmissions. The value of the phase shift can be a value that is known to both the receiver and the transmitter. The value of the phase shift can be determined by the receiver and informed to the transmitter. Alternatively, since the phase shift is varied depending on a bit mask pattern, the bit mask pattern can be previously known between the receiver and the transmitter. A bit mask pattern to be used can be determined by the receiver and informed to the transmitter.

Figure 4:
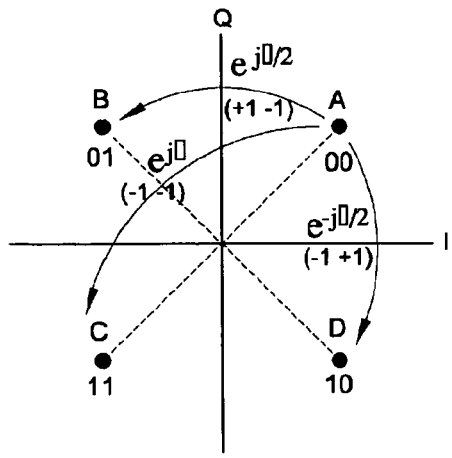
FIG. 4 is a view showing a bit mask pattern on a QPSK signal constellation.

FIG. 4 is a view showing a bit mask pattern on a QPSK signal constellation. Gray mapping is assumed, but it is not limited to a mapping method. Anti-gray mapping or random mapping can be used.

Referring to FIG. 4, the mapping is considered based on data symbol A. A bit mask pattern (1, −1) is used to shift the phase of data symbol A as much as π/2 radians in QPSK modulation. If bit masking is performed on a bit stream in order of (1, −1) by two bits, the phase is shifted as much as π/2 radians. Hereinafter, '−1' of the bit mask pattern means a bit inversion. Since a bit stream mapped to the data symbol A is (0, 0), when the bit mask pattern (1, −1) is applied to the bit stream (0, 0), the bit stream (0, 0) becomes a new bit stream (0, 1), and as a result, the data symbol A is mapped to data symbol B whose phase is shifted as much as π/2 radians from the data symbol A.

A bit mask pattern (−1, −1) is used to shift the phase of data symbol A as much as π radians in QPSK modulation. When bit masking is performed on a bit stream in order of (−1, −1) by two bits, the phase is shifted as much as π radians. Since a bit stream mapped to the data symbol A is (0, 0), when the bit mask pattern (−1, −1) is applied to the bit stream (0, 0), the bit stream becomes bit stream (1, 1), and as a result, the data symbol A is mapped to data symbol C whose phase is shifted as much as π radians from the data symbol A.

A bit mask pattern (−1, 1) is used to shift the phase of data symbol A as much as −π/2 radians in QPSK modulation. Here, a negative phase shift is that if the counter-clockwise direction is positive as shown in FIG. 4, the reverse direction, i.e., the clockwise direction, is considered as negative, and it does not limit a direction for a phase shift. If bit masking is performed on a bit stream in order of (−1, 1) by two bits, the phase is shifted as much as π/2 radians. That is, since a bit stream mapped to the data symbol A is (0, 0), if the bit mask pattern (−1, 1) is applied to the bit stream (0, 0), the bit stream becomes bit stream (1, 0), and as a result, the data symbol A is mapped to data symbol D whose phase is shifted as much as −π/2 radians from the data symbol A.

Data symbol A can be shifted to other data symbols B, C, and D through bit mask patterns (1, −1), (−1, −1), and (−1, 1) in QPSK modulation. Furthermore, data symbol B can be shifted to other data symbols C, D, and A through the same bit mask patterns, which is the same with data symbols C and D. Accordingly, a phase can be simply shifted on a signal constellation through masking of a bit level. If a log-likelihood ratio (LLR) of retransmission data is combined with the LLR of initial data, complexity of phase control performed through bit masking can be lowered compared with that of phase control performed at a symbol level. Accordingly, operation of a phase shift at a bit level is simple compared with that of a phase shift at a symbol level, and a phase can be further correctly and easily restored through de-masking at the receiver.

Table 1 shows an example of performing bit masking on a series of initial data.

Table 1

TABLE 1

| Initial data | (MSB) 1 1 1 0 0 0 0 1 (LSB) |
|---|---|
| Bit mask pattern | −1 −1 |
| Retransmission data | (MSB) 0 0 0 1 1 1 1 0 (LSB) |

Retransmission data is generated by sequentially bit masking arbitrary initial data two bits at a time using a bit mask pattern (−1, −1) from the least significant bit (LSB) to the most significant bit (MSB). The phase of the retransmission data is shifted as much as π radians from the initial data.

Figure 5:
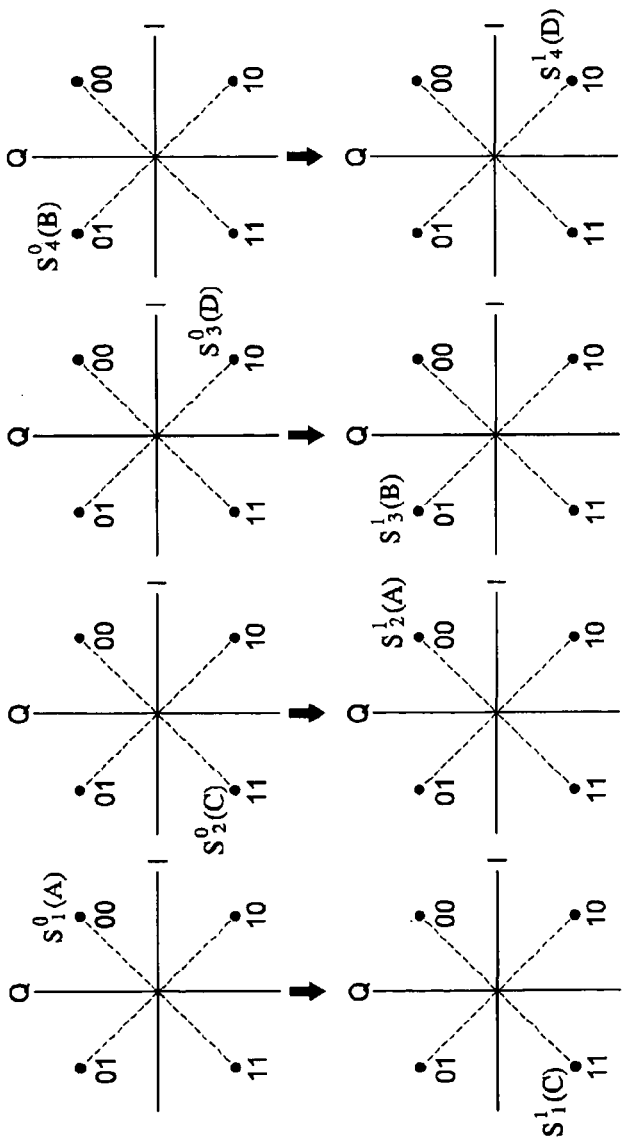
FIG. 5 is a view showing an example of a HARQ method in QPSK modulation.

FIG. 5 is a view showing an example of a HARQ method in QPSK modulation.

Referring to FIG. 5, it is assumed that data $S^0_1(A)$, $S^0_2(B)$, $S^0_3(C)$ and $S^0_4(D)$ are sequentially transmitted. Here, $S^n_m(X)$ denotes a m-th symbol which is mapped to a symbol X and is retransmitted at n-th time. For example, $S^0_1(A)$ is a first symbol which is mapped to symbol A and is transmitted initially (0-th retransmission). $S^1_1(C)$ is a first symbol which is mapped to symbol C and is first retransmission data.

If $S^0_1(A)$, i.e., the first data, is failed to be transmitted, $S^1_1(C)$ whose phase is shifted as much as π radians is transmitted when data is retransmitted. If the initial data $S^1_1(A)$ is bit masked using a mask pattern (−1, −1), the initial data can be shifted as much as π radians to be retransmission data $S^1_1(C)$. If $S^0_2(C)$, i.e., the second data, is failed to be transmitted, $S^1_2(A)$ whose phase is shifted as much as π radians is transmitted when data is retransmitted. If $S^0_3(D)$, i.e., the third data, is failed to be transmitted, $S^1_3(B)$ whose phase is shifted as much as π radians is transmitted when data is retransmitted. If $S^0_4(B)$, i.e., the fourth data, is failed to be transmitted, $S^1_4(D)$ whose phase is shifted as much as π radians is transmitted when data is retransmitted.

Figure 6:
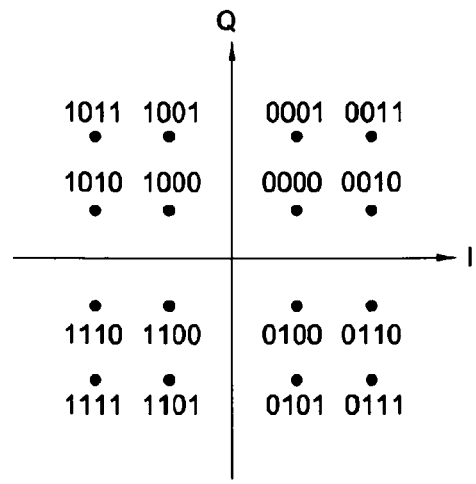
FIG. 6 is a view showing an example of 16-QAM signal constellation.

FIG. 6 is a view showing an example of 16-QAM signal constellation.

Referring to FIG. 6, a bit mask pattern for shifting a phase as much as π radians in 16-QAM modulation can be (−1, −1, 1, 1). If bit masking is performed on a bit stream (or a bit stream) by four bits in order of (−1, −1, 1, 1), the phase is shifted as much as π radians. For example, if the bit mask pattern (−1, −1, 1, 1) is applied to a bit stream (0, 0, 1, 1), the bit stream becomes bit stream (1, 1, 0, 0). The phase of a symbol represented by bit stream (1, 1, 0, 0) on a 16-QAM constellation is shifted as much as π radians compared with the phase of a symbol represented by bit stream (0, 0, 1, 1).

The bit stream representing each symbol is merely an example, and its location can be changed. If a bit stream representing each symbol is changed, a bit mask pattern for shifting a phase may be changed.

Figure 7:
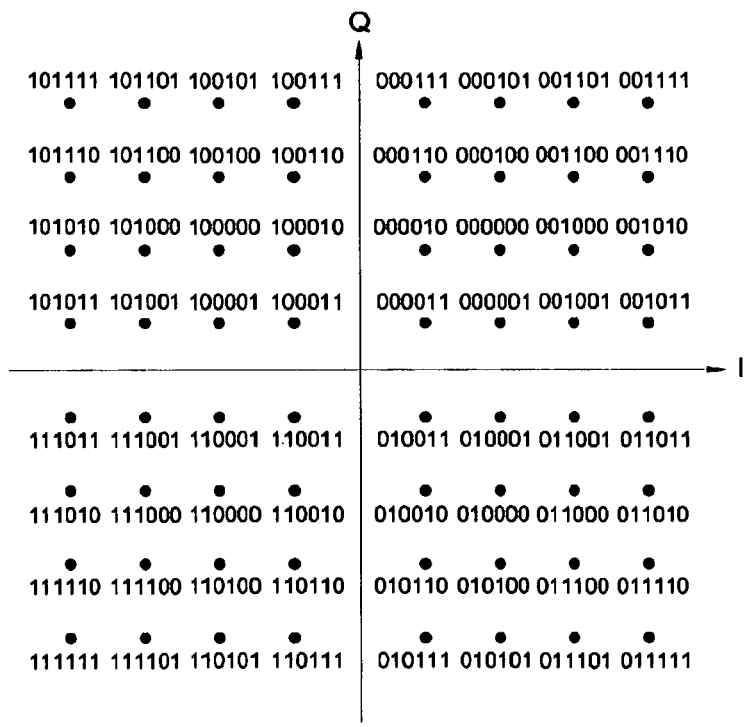
FIG. 7 is a view showing an example of 64-QAM signal constellation.

FIG. 7 is a view showing an example of 64-QAM signal constellation.

Referring to FIG. 7, a bit mask pattern for shifting a phase as much as π radians in 64-QAM modulation can be (−1, −1, 1, 1, 1, 1). If bit masking is performed on a bit stream (or a bit stream) by six bits in order of (−1, −1, 1, 1, 1, 1), the phase is shifted as much as π radians. For example, the bit mask pattern (−1, −1, 1, 1, 1, 1) is applied to bit stream (1, 0, 1, 1, 1, 1), the bit stream becomes bit stream (0, 1, 1, 1, 1, 1). The phase of a symbol represented by bit stream (1, 0, 1, 1, 1, 1) on a 64-QAM constellation is shifted as much as π radians compared with the phase of a symbol represented by bit stream (0, 1, 1, 1, 1, 1).

QPSK, 16-QAM, and 64-QAM modulations are disclosed as examples, a modulation scheme having an order higher than 64-QAM can be applied. A bit mask pattern corresponding to the modulation scheme can easily be obtained.

Figure 8:
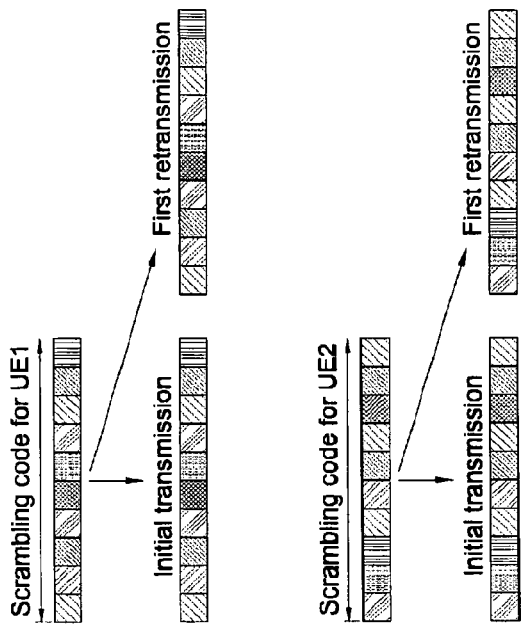
FIG. 8 is a view showing an example of allocating a scrambling code.

FIG. 8 is a view showing an example of allocating a scrambling code.

Referring to FIG. 8, different scrambling codes are allocated to different users. A scrambling code allocated to each user is used for initial transmission and subsequent retransmissions in the same manner. This enables to easily design a bit mask pattern.

Figure 9:
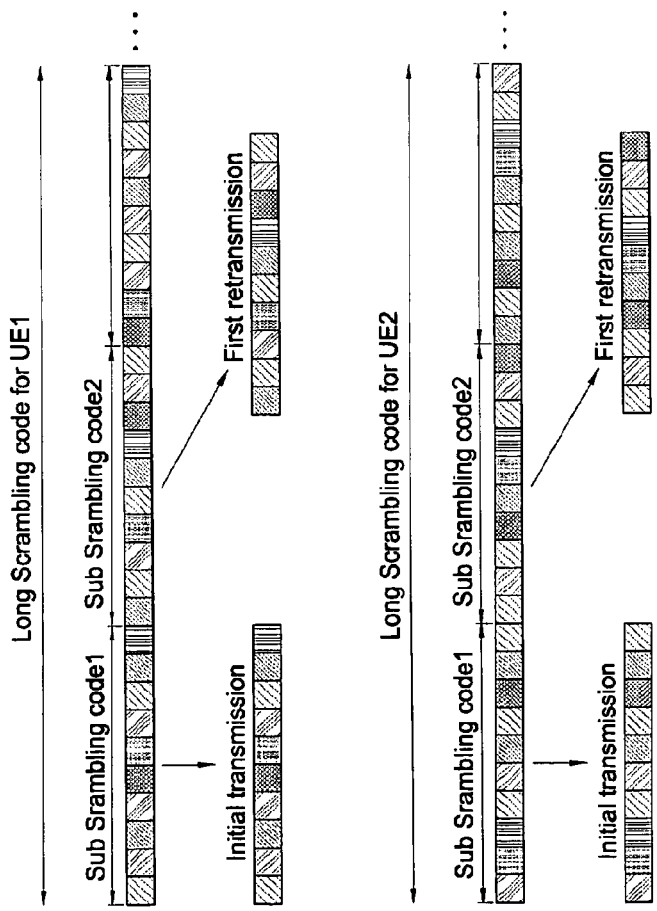
FIG. 9 is a view showing another example of allocating a scrambling code.

FIG. 9 is a view showing another example of allocating a scrambling code.

Referring to FIG. 9, different long scrambling codes are allocated to different users. The length of a long scrambling code is longer than the length of a scrambling code needed for one transmission. If the scrambling code needed for one transmission is assumed to be a sub-scrambling code, the long scrambling code is configured as a set containing a plurality of sub-scrambling codes. A different sub-scrambling code selected from the long scrambling code is allocated for initial transmission and retransmission.

Figure 10:
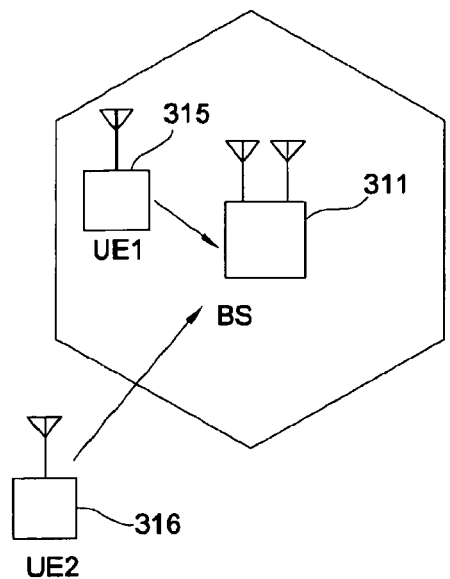
FIG. 10 is a view showing an example of inter-cell interference.

FIG. 10 is a view showing an example of inter-cell interference.

Referring to FIG. 10, user 1 (UE1) 315 transmits data to a base station (BS) 311. At this point, the base station 311 can receive a signal transmitted by user 2 (UE2) 316 located outside of a cell. If user 1 315 and user 2 316 share the same radio resources or orthogonality is not guaranteed between signals of the users, the signal of user 2 316 operates as an interference to a signal of user 1 315 from the view point of the base station 311. Although one external cell and one user are shown as interference in the figure, a plurality of users in a plurality of external cells can operate as interference.

A scrambling code can be allocated to each user. It is assumed that a scrambling code applied to user 1 315 is scrambling code 1, and a scrambling code applied to user 2 316 is scrambling code 2.

Figure 11:
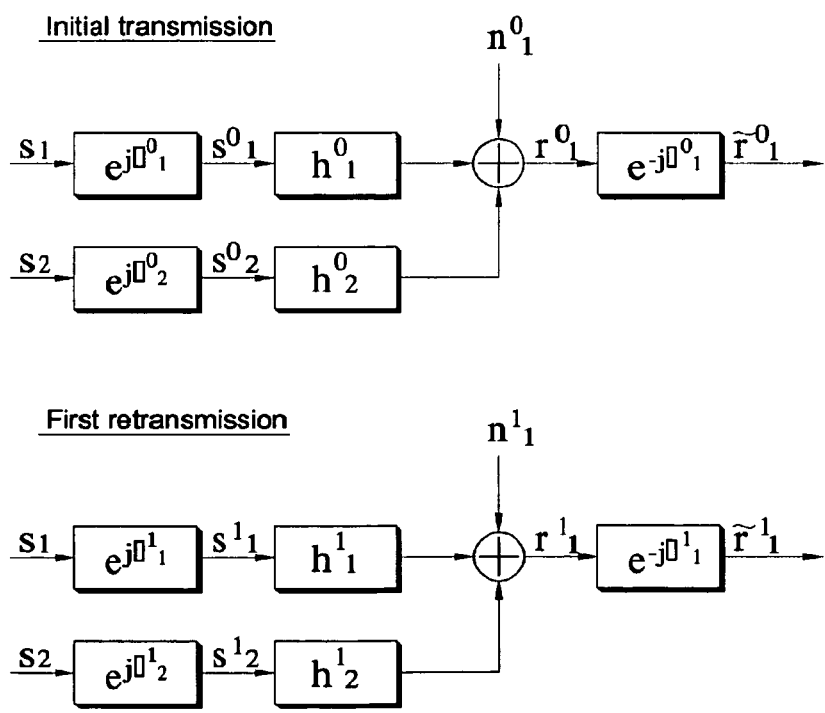
FIG. 11 is a view showing a model according to initial transmission and retransmission in the system of FIG. 10.

FIG. 11 is a view showing a model according to initial transmission and retransmission in the system of FIG. 10. $s_1$ and $s_2$ are data transmitted by user 1 and user 2, respectively. The data can be a scrambled code to which a scrambling code is applied for each user. Scrambling code 1 is applied to $s_1$, and scrambling code 2 is applied to $s_2$. $s''_m$ means the n-th transmission data for the m-th user, which is obtained from the scrambled code by shifting a phase. $r''_m$ means the n-th receive data for the m-th user.

Referring to FIG. 11, when data $s^0_1$ of user 1 and data $s^0_2$ of user 2 are transmitted in initial transmission, data $r^0_1$ of user 1 received by the base station can be expressed as shown MathFigure 2

$$r^0_1 = h^0_1 s_1 e^{j\theta^0_1} + h^0_2 s_2 e^{j\theta^0_2} + n^0_1 \quad [\text{Math. 2}]$$

where $h^0_1$ and $h^0_2$ are respectively channels for user 1 an user 2 in the initial transmission, $\theta^0_1$ and $\theta^0_2$ are respectively values of phase shifts for user 1 and user 2 in the initial transmission, and $n^0_1$ is a noise for user 1 in the initial transmission. Receive data $r^0_1$ is detected as $$\tilde{r}^0_1 = e^{-j\theta^0_1}$$

by an inverse phase shift.

If data $s^1_1$ of user1 and data $s^1_2$ of user 2 are transmitted in the first retransmission, data $r^1_1$ of user 1 received by the base station can be expressed as shown MathFigure 3

$$r^1_1 = h^1_1 s_1 e^{j\theta^1_1} + h^1_2 s_2 e^{j\theta^1_2} + n^1_1 \quad [\text{Math. 3}]$$

where $h^1_1$ and $h^1_2$ are respectively channels for user 1 an user 2 in the retransmission, $\theta^1_1$ and $\theta^1_2$ are respectively values of phase shifts for user 1 and user 2 in the retransmission, and $n^1_1$ is a noise for user 1 in the retransmission. Receive data $r^1_1$ is detected as $$\tilde{r}^1_1 = e^{-j\theta^1_1}$$

by a phase re-shift.

A combining expression of the initial transmission and the retransmission is as shown below.

MathFigure 4

$$r^0_1 + r^1_1 = \left(h^0_1 e^{j\theta^0_1} + h^1_1 e^{j\theta^1_1}\right)s_1 + \left(h^0_2 e^{j\theta^0_2} + h^1_2 e^{j\theta^1_2}\right)s_2 + n^0_1 + n^1_1 \quad [\text{Math. 4}]$$

From the view point of equivalent channels fir $s_1$ and $s_2$ in the initial transmission and retransmission, channel selectivity is changed depending on $\theta^0_1$ and $\theta^1_1$, and $\theta^0_2$ and $\theta^1_2$. The higher the channel selectivity is, the higher channel diversity gain can be obtained by combining the data. This can be further effective as modulation order is further higher than 16-QAM.

When chase combining is used, symbol $$\tilde{s}_1$$

for user 1 detected by HARQ can be induced from Equations 2 and 3 as shown

MathFigure 5

$$\tilde{s}_1 = h^*_1(\tilde{r}^0_1 + \tilde{r}^1_1) \quad [\text{Math. 5}]$$
$$= h^*_1\left(r^0_1 e^{-j\theta^0_1} + r^1_1 e^{-j\theta^1_1}\right)$$
$$= h^*_1\left\{\left(h^0_1 e^{j(\theta^0_1 - \theta^0_1)} + h^1_1 e^{j(\theta^1_1 - \theta^1_1)}\right)s_1 + \left(h^0_2 e^{j(\theta^0_2 - \theta^0_1)} + h^1_2 e^{j(\theta^1_2 - \theta^1_1)}\right)s_2 + n^0_1 e^{-j\theta^0_1} + n^1_1 e^{-j\theta^1_1}\right\}$$

where h* is a conjugate of a channel, and a matched filter is used to detect h*. However, a detecting scheme is not limited to this, and a zero-focusing (ZF) type, minimum mean square error (MMSE) type, maximum likelihood (ML) type, or Bell Labs layered space time (BLAST) type can be used. Since channel $h_2$ of user 2 cannot be estimate by the base station, it is detected using channel $h_1$ of user 1. In addition, although it is assumed that channel $h^0_1$ of the initial transmission and channel $h^1_1$ of the retransmission are almost not changed, it is a Equation for the case where the channels are changed can be obtained.

In symbol $$\tilde{s}_1$$

for user 1, terms for data s2 of user 2 are undesired terms. If the phase of a scrambled code is shifted as much as π radians in the initial transmission and retransmission, following condition is satisfied.

MathFigure 6

$$\theta_2^1 - \theta_1^1 = \theta_2^0 - \theta_1^0 + \pi \quad [\text{Math.6}]$$

If Equation 6 substitutes for terms related to data $s_2$ of user 2 in Equation 5, it becomes as shown below.

MathFigure 7

$$\left(h^0_2 e^{j(\theta^0_2 - \theta^0_1)} + h^1_2 e^{j(\theta^1_2 - \theta^1_1)}\right)s_2 = \left(h^0_2 e^{j(\theta^0_2 - \theta^0_1)} + h^1_2 e^{j(\theta^0_2 - \theta^0_1 + \pi)}\right)s_2 \quad [\text{Math. 7}]$$
$$= \left(h^0_2 e^{j(\theta^0_2 - \theta^0_1)} - h^1_2 e^{j(\theta^0_2 - \theta^0_1)}\right)s_2$$
$$\cong 0$$

When difference between a channel for the initial transmission and a channel for the retransmission is small (i.e., $h^0_2 \approx h^1_2$), interference can be ignored. Or, although the difference is large, interference can be mitigated.

If a phase shift is not applied to a scrambled code in the initial transmission ($\theta^0_1 = \theta^0_2 = 0$) and the phase of a scrambled code is shifted only in the retransmission as much as π radians compared with that of the initial transmission, symbol $\tilde{s}_1$ for user 1 detected by HARQ can be expressed as shown below.

MathFigure 8

$$\tilde{s}_1 = h_1^*(\tilde{r}_1^0 + \tilde{r}_1^1)$$
$$= h_1^*(r_1^0 + r_1^1 e^{-j\theta_1^1})$$
$$= h_1^*\{(h_1^0 + h_1^1 e^{j(\theta_1^1 - \theta_1^1)})s_1 + (h_2^0 + h_2^1 e^{j(\theta_2^1 - \theta_1^1)})s_2 + (n^0 + n^1 e^{-j\theta_1^1})\}$$

[Math. 8]

Since $|\theta^1_1 - \theta^1_2| = \pi$, if the difference between a channel for the initial transmission and a channel for the retransmission is small, the terms corresponding to interference can be canceled.

Figure 12:
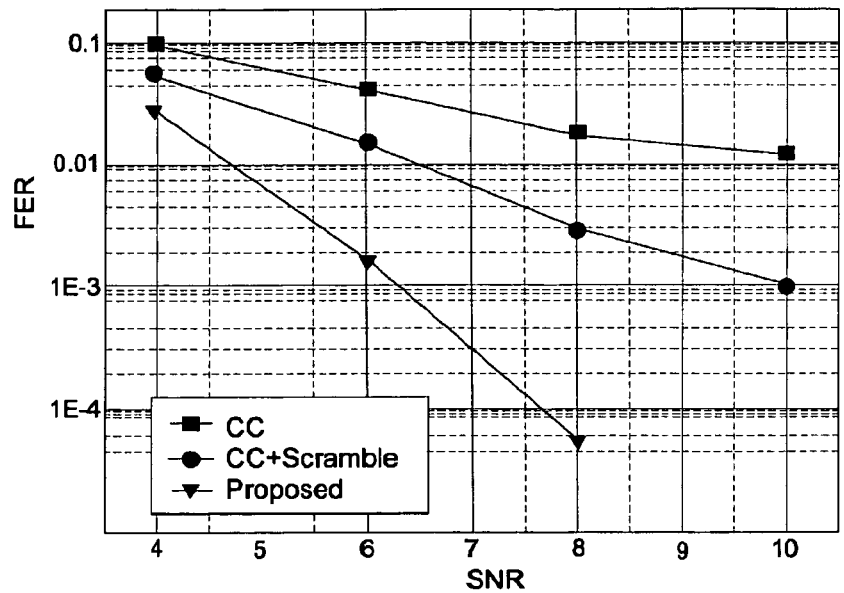
FIG. 12 is a view showing an effect of a phase shift on inter-cell interference as a graph of signal-to-noise (SNR) to frame error rate (FER).

FIG. 12 is a view showing an effect of a phase shift on inter-cell interference as a graph of signal-to-noise (SNR) to frame error rate (FER). 'CC' is a case where chase combining is used, and 'CC+scramble' is a case where a scrambling code is applied to chase combining. A transmission method used in the simulation is SC-FDMA, speed of a user is 30 Km/h, and a TU channel model is used. One transmit antenna and two receive antennas are used. A turbo code having a code rate of ½ in QPSK modulation is applied to each user, and an MMSE 1 tap equalizer is used. It is assumed that two users simultaneously connect to allocated channels, and a transmission signal of a user operating as interference is 0.25 times of a signal desired by a user.

Referring to FIG. 12, link performance obtained through chase combining is lower than performance obtained when a scrambling code for distinguishing each user is used. In addition, if the proposed technique is used, further improved link performance can be obtained.

Figure 13:
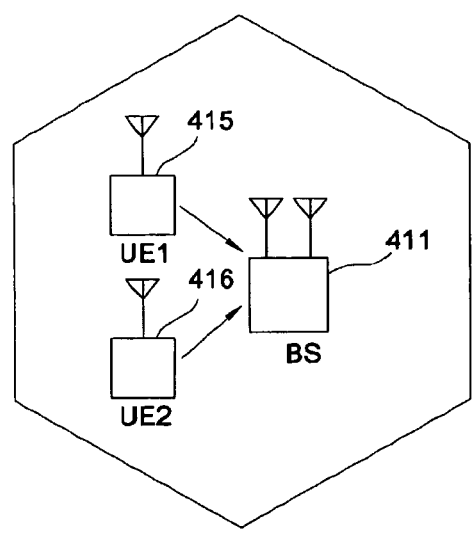
FIG. 13 is a view showing an example of intra-cell interference.

FIG. 13 is a view showing an example of intra-cell interference. In an intra-cell environment, if user 1 (UE 1) 415 and user 2 (UE 2) 416 located in the same cell simultaneously use same radio resources, interference to other users may occur as in the inter-cell environment. It is assumed that each of the users 415 and 416 uses one transmit antenna, and a base station (BS) 411 uses two receive antennas. Such a structure configured with multiple antennas can be a structure of a virtual MMO.

Referring to FIG. 13, user 1 (UE 1) 415 transmits data to the base station (BS) 411. At this point, the base station 411 can receive a signal transmitted by user 2 (UE2) 416 located within the cell. If user 1 415 and user 2 416 share the same radio resources or orthogonality is not guaranteed between signals of the users, the signal of user 2 416 operates as interference to a signal of user 1 415 from the view point of the base station 411. Although one user is shown as interference, a plurality of users can operate as interference.

A scrambling code can be allocated to each user. It is assumed that a scrambling code applied to user 1 415 is scrambling code 1, and a scrambling code applied to user 2 416 is scrambling code 2.

Unlike the inter-cell interference, the base station 411 may know the channel of user 2 416 who can be regarded as an interferer. It is since that user 2 416, as well as user 1 415, also belongs to users for whom the base station 411 provides services. Accordingly, detection for users 1 and 2 can be expressed as shown below.

MathFigure 9

$$\begin{bmatrix} \tilde{s}_1 \\ \tilde{s}_2 \end{bmatrix} = G[h_1 \ h_2]\begin{bmatrix} s_1 \\ s_2 \end{bmatrix} + Gn_1$$

[Math. 9]

If an MMSE equalizer is used, G is as shown below.

MathFigure 10

$$G = G_{MMSE} = \left(\tilde{H}^H \tilde{H} + \frac{\sigma_n^2}{\sigma_s^2}I\right)^{-1}\tilde{H}^H$$

[Math. 10]

Here, $\tilde{H}$ is an estimated channel matrix, $(.)^H$ is a Hermitian matrix, I is an identity matrix, $\sigma_n$ is a noise variance, and $\sigma_s$ is a signal variance.

If $G_{MMSE}$ is used, detection can be induced from Equation 9 as shown below.

MathFigure 11

$$\begin{bmatrix} \tilde{s}_1 \\ \tilde{s}_2 \end{bmatrix} = ke^{j\pi/2} \begin{bmatrix} \frac{|h_1|^2}{SNR}s_1 + \frac{-h_2^*h_1}{SNR}s_1 + \frac{-|h_2|^2}{SNR}s_2 + \frac{h_1^*h_2}{SNR}s_2 + \\ \left\{\left(h_2^*h_2 + \frac{1}{SNR}\right)h_1^* + \left(-h_1^*h_2 - \frac{1}{SNR}\right)h_2^*\right\}n_1 \\ \frac{|h_2|^2}{SNR}s_2 + \frac{-h_1^*h_2}{SNR}s_2 + \frac{-|h_1|^2}{SNR}s_1 + \frac{h_2^*h_1}{SNR}s_1 + \\ \left\{\left(-h_2^*h_1 - \frac{1}{SNR}\right)h_1^* + \left(h_1^*h_1 + \frac{1}{SNR}\right)h_2^*\right\}n_1 \end{bmatrix}$$

[Math. 11]

In the expression related to detection symbol $\tilde{s}_1$ of user 1, terms related to transmission data $s_2$ of user 2 can be regarded as residual inter symbol interference (ISI) portions. In addition, in the expression related to detection symbol $\tilde{s}_2$ of user 2, terms related to transmission data $s_1$ of user 1 can be regarded as residual ISI portions.

After shifting a phase for the scrambled code of transmission data s1 of user 1 in the initial transmission and retransmission ($\theta^0_1$ and $\theta^1_1$), and shifting a phase for the scrambled code of transmission data $s_2$ of user 2 in the initial transmission and retransmission ($\theta^0_2$ and $\theta^1_2$), a detection expression for users 1 and can be shown as shown below.

MathFigure 12

$$\tilde{s}_1 = ke^{j\pi/2}\left[2\left(\frac{|h_1|^2}{SNR} - \frac{h_2^* h_1}{SNR}\right)s_1 + \right.$$
$$\left(\frac{-|h_2|^2}{SNR} + \frac{h_1^* h_2}{SNR}\right)\left(e^{j(\theta_2^0 - \theta_1^0)} + e^{j(\theta_2^1 - \theta_1^1)}\right)s_2 +$$
$$\left\{\left(h_2^* h_2 + \frac{1}{SNR}\right)h_1^* + \left(-h_1^* h_2 - \frac{1}{SNR}\right)h_2^*\right\}$$
$$\left.\left(n_1^0 e^{-j\theta_1^0} + n_1^1 e^{-j\theta_1^1}\right)\right]$$

$$\tilde{s}_2 = ke^{j\pi/2}\left[2\left(\frac{|h_2|^2}{SNR} - \frac{h_1^* h_2}{SNR}\right)s_2 + \right.$$
$$\left(\frac{-|h_1|^2}{SNR} + \frac{h_2^* h_1}{SNR}\right)\left(e^{j(\theta_1^0 - \theta_2^0)} + e^{j(\theta_1^1 - \theta_2^1)}\right)s_1 +$$
$$\left\{\left(-h_2^* h_1 - \frac{1}{SNR}\right)h_1^* + \left(h_1^* h_1 + \frac{1}{SNR}\right)h_2^*\right\}$$
$$\left.\left(n_1^0 e^{-j\theta_2^0} + n_1^1 e^{-j\theta_2^1}\right)\right]$$

[Math. 12]

Through a phase shift on a signal constellation, a relation of $\theta_2^1 - \theta_1^1 = \theta_2^0 - \theta_1^0 + \pi$ is established. It is understood that the residual ISI portions are canceled if the difference between a channel of the initial transmission and a channel of the retransmission is small. The residual ISI portions can be reduced even when the channel difference is large. In the same manner, if a phase is not shifted in the initial transmission and a phase of the scrambled code is shifted as much as $|\theta_1^1 - \theta_2^1| = \pi$ only in the retransmission, the residual ISI portions are canceled or mitigated.

Figure 14:
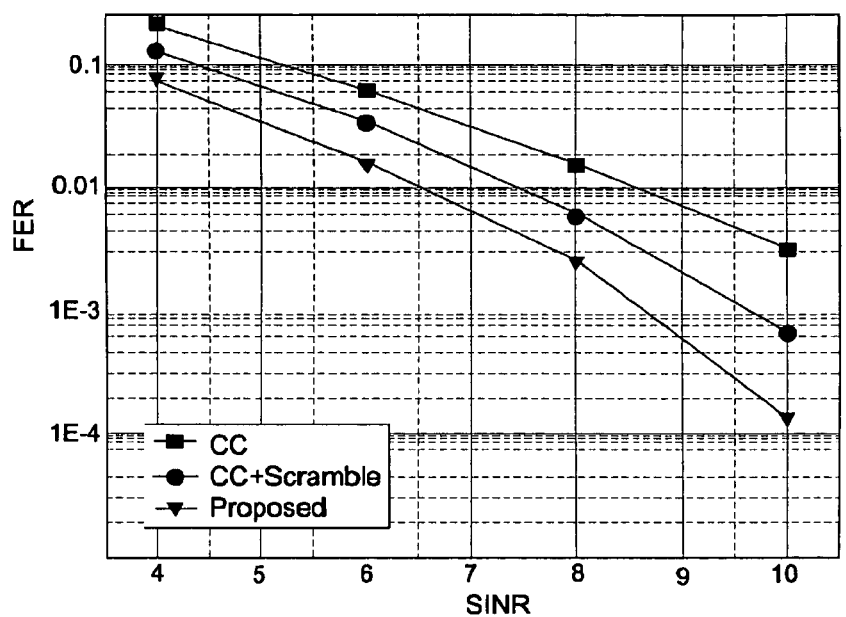
FIG. 14 is a view showing an effect of a phase shift on intra-cell interference as a graph of signal-to-noise (SNR) to frame error rate (FER).

FIG. 14 is a view showing an effect of a phase shift on intra-cell interference as a graph of signal-to-noise (SNR) to frame error rate (FER). 'CC' is a case where chase combining is used, and 'CC+scramble' is a case where a scrambling code is applied to chase combining. Simulation parameters are the same as those of the inter-cell interference model.

Referring to FIG. 14, link performance obtained through chase combining is lower than performance obtained when a scrambling code for distinguishing each user is used. In addition, if a scrambling code using the proposed technique is used, further improved link performance can be obtained.

Therefore, if a user scrambling code is designed based on the proposed technique, interference coming from other cells and residual ISI of users simultaneously connecting within the same cell can be completely canceled or mitigated.

Figure 15:
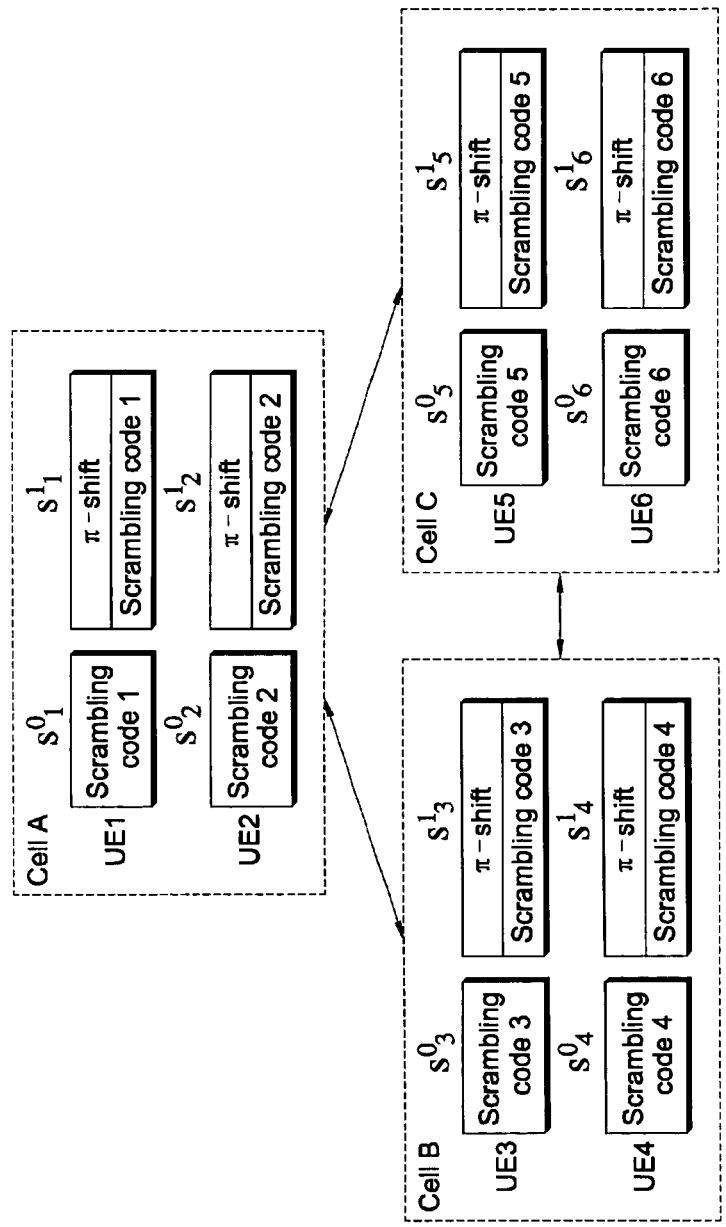
FIG. 15 is a block diagram showing allocation of a scrambling code according to an embodiment of the invention.

FIG. 15 is a block diagram shaving allocation of a scrambling code according to an embodiment of the invention. Although it is assumed that there are three cells and two users in each of the cells as an example, the number of cells and users in each cell is not limited.

Referring to FIG. 15, different scrambling codes are allocated to all users in cells A, B, and C. Scrambling code 1 is allocated to user 1 (UE 1), scrambling code 2 is allocated to user 2 (UE 2), scrambling code 3 is allocated to user 3 (UE 3), scrambling code 4 is allocated to user 4 (UE 4), scrambling code 5 is allocated to user 5 (UE 5), and scrambling code 6 is allocated to user 6 (UE 6).

In initial transmission, each of the users transmits a scrambled code. In retransmission, a scrambled code recombined by applying bit masking to shift the phase of a scrambled code of each user as much as π radians is transmitted.

In this case, inter-cell interference and/or intra-cell interference can be canceled or mitigated. Since all the users of the inter-cell and intra-cell are allocated with user scrambling codes uncorrelated to one another, inter-cell and intra-cell interference is canceled. Interference of users located in different cells is mitigated by the π phase shift. In addition, residual ISI operating to each of two users among users located in the same cell who simultaneously use same channels is canceled by the π phase shift. Accordingly, an improved overall throughput gain can be obtained.

Figure 16:
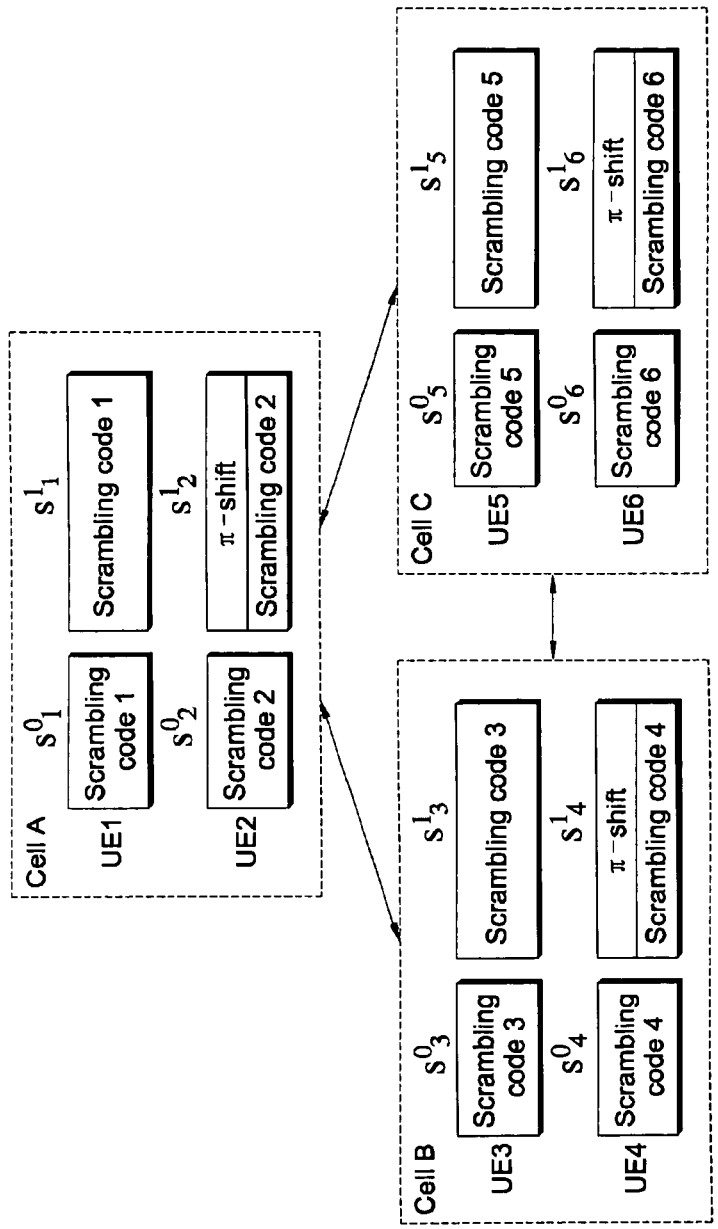
FIG. 16 is a block diagram showing allocation of a scrambling code according to an embodiment of the invention.

FIG. 16 is a block diagram showing allocation of a scrambling code according to an embodiment of the invention.

Referring to FIG. 16, different scrambling codes are allocated to all users in cells A, B, and C. In the initial transmission, each of the users transmits a scrambled code. In the retransmission, at least one of the users in the same cell does not apply a phase shift, and a phase shift is applied as much as π to a scrambled code for other users.

If a phase is shifted as much as π radian between intra-cell and/or inter-cell users, intra-cell and/or inter-cell interference can be canceled or mitigated. Since all the users of the inter-cell and intra-cell are allocated with user scrambling codes uncorrelated to one another, inter-cell and intra-cell interference is canceled.

Figure 17:
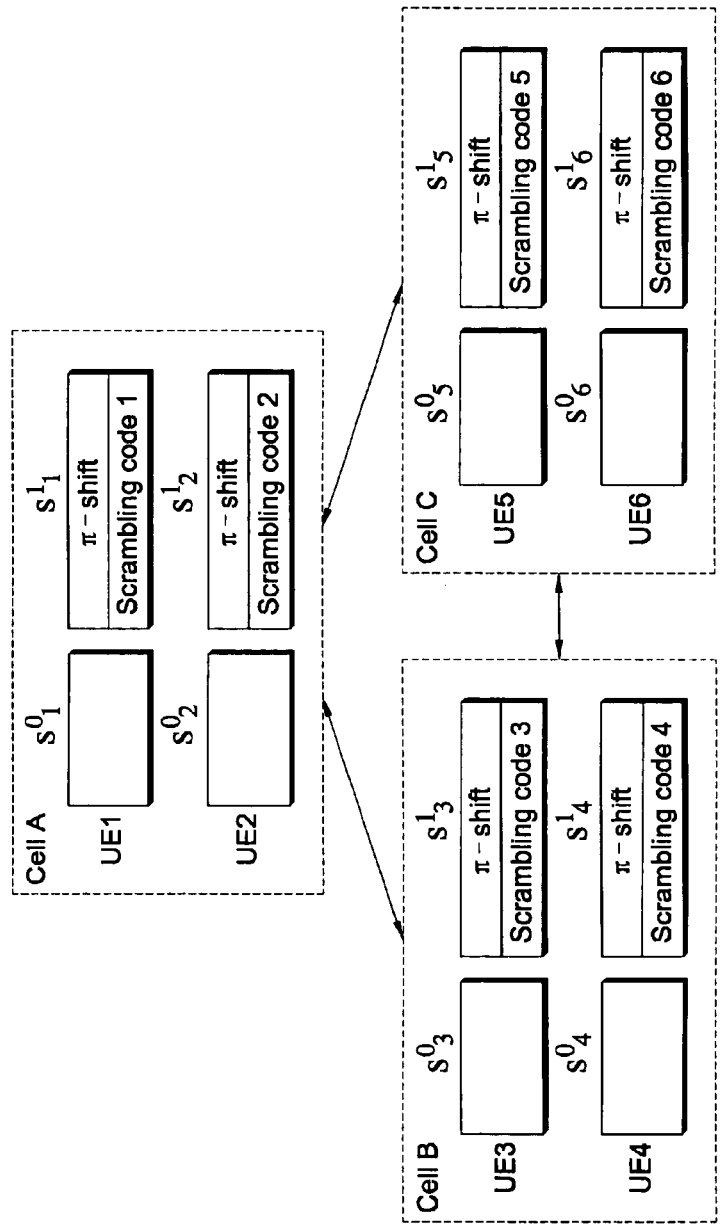
FIG. 17 is a block diagram showing allocation of a scrambling code according to an embodiment of the invention.

FIG. 17 is a block diagram shaving allocation of a scrambling code according to an embodiment of the invention.

Referring to FIG. 17, any user in cells A, B, and C is not allocated with a scrambling code in the initial transmission. In the retransmission, different scrambling codes are allocated to all users in cells A, B, and C. In the retransmission, a scrambled code recombined by applying bit masking to shift the phase of a scrambled code of each user as much as π radians is transmitted.

In the initial transmission, a scrambling code is not allocated to save resources consumed for the scrambling code. If an error is occurred in the initial transmission due to interference from other users and thus retransmission is required, a scrambling code and a π phase shift are simultaneously applied to cancel or mitigate inter-cell interference and/or intra-cell interference.

Figure 18:
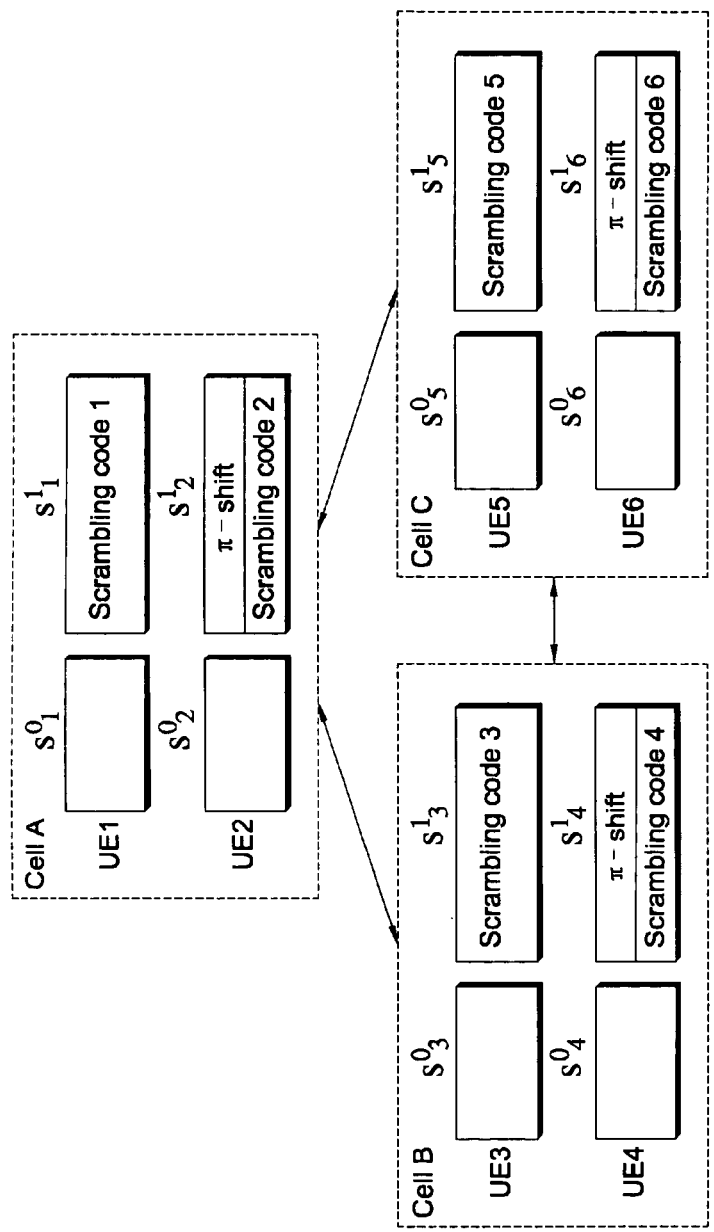
FIG. 18 is a block diagram showing allocation of a scrambling code according to an embodiment of the invention.

FIG. 18 is a block diagram shaving allocation of a scrambling code according to an embodiment of the invention;

Referring to FIG. 18, any user in cells A, B, and C is not allocated with a scrambling code in the initial transmission. In the retransmission, different scrambling codes are allocated to all users in cells A, B, and C. Then, in the retransmission, at least one of the users in the same cell does not apply a phase shift, and a phase shift is applied as much as π to a scrambled code for other users.

In the initial transmission, a scrambling code is not allocated to save resources consumed for the scrambling code. If an error is occurred in the initial transmission due to interference from other users and thus retransmission is required, a scrambling code or a π phase shift is applied to cancel or mitigate inter-cell interference and/or intra-cell interference.

Figure 19:
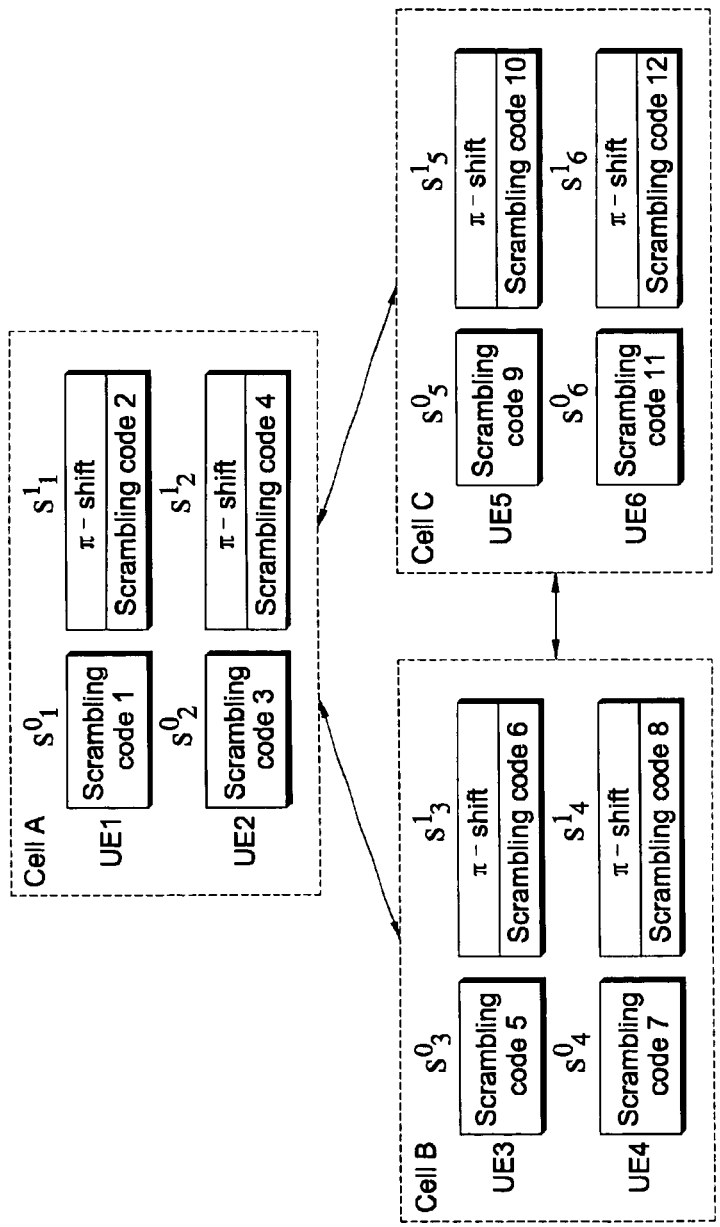
FIG. 19 is a block diagram showing allocation of a scrambling code according to an embodiment of the invention.

FIG. 19 is a block diagram shaving allocation of a scrambling code according to an embodiment of the invention.

Referring to FIG. 19, a long scrambling code is allocated to all users in cells A, B, and C. The long scrambling code can be said as a set of a plurality of sub-scrambling codes. In the initial transmission, different first sub-scrambling codes are not allocated to all users in cells A, B, and C. In the retransmission, different second sub-scrambling codes are allocated to all users in cells A, B, and C. In the retransmission, a scrambled code recombined by applying bit masking to shift the phase of a scrambled code of each user as much as π radians is transmitted.

Inter-cell interference and/or intra-cell interference is canceled by applying different scrambling codes in the initial transmission and retransmission. A scrambling code and a π phase shift are simultaneously applied to cancel or mitigate inter-cell interference and/or intra-cell interference occurred by other users.

Figure 20:
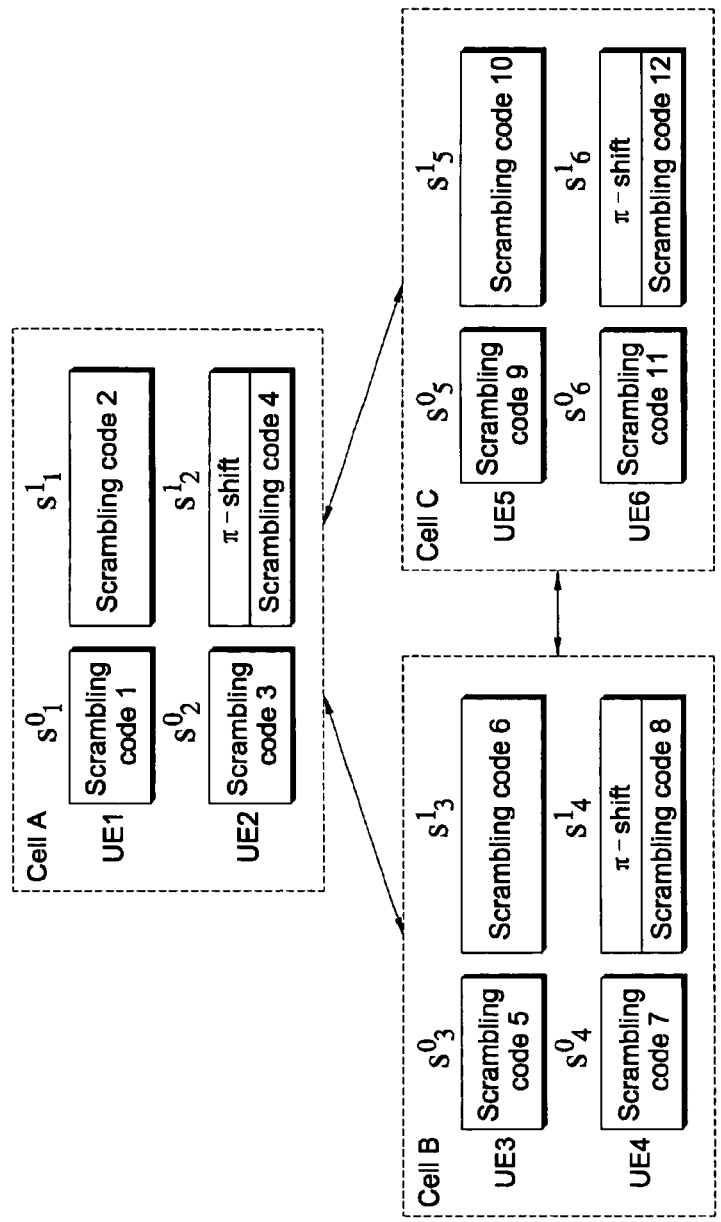
FIG. 20 is a block diagram showing allocation of a scrambling code according to an embodiment of the invention.

FIG. 20 is a block diagram shaving allocation of a scrambling code according to an embodiment of the invention.

Referring to FIG. 20, a long scrambling code is allocated to all users in cells A, B, and C. The long scrambling code can be said as a set of a plurality of sub-scrambling codes. In the initial transmission, different first sub-scrambling codes are not allocated to all users in cells A, B, and C. In the retransmission, different second sub-scrambling codes are allocated to all users in cells A, B, and C. In the retransmission, at least one of the users in the same cell does not apply a phase shift, and a phase shift is applied as much as π to a scrambled code for other users.

Inter-cell interference and/or intra-cell interference is canceled by applying different scrambling codes in the initial transmission and retransmission. A scrambling code or a π phase shift is applied to cancel or mitigate inter-cell interference and/or intra-cell interference caused by other users.

Although a phase shift in the initial transmission and retransmission is disclosed, same symbol is repeatedly transmitted using the phase shift. For example, it is assumed that two same symbols undergo single transmission. A receiver can combine the two symbols in the single transmission as shown MathFigure 13

$$r = (h^1 e^{j\theta^1} + h^2 e^{j\theta^2})s + n \quad [\text{Math. 13}]$$

where r is receive data, s is transmit data, n is a noise, $h^1$ and $h^2$ are channels for the first symbol and the second symbol, and $\theta^1$ and $\theta^2$ are phase shift values for the first symbol and the second symbol. Here, it is that $$|\theta^1 - \theta^2| = \frac{a}{b}\pi$$

(a and b are constants). Channel selectivity is changed depending on a phase shift, and diversity gain can be enhanced.

Figure 21:
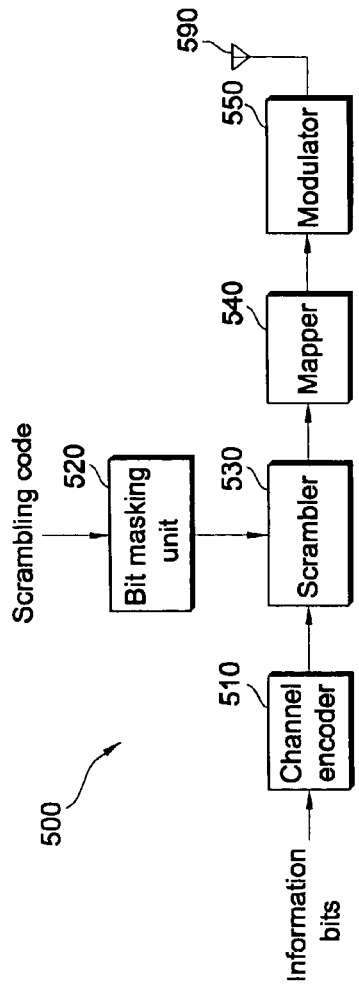
FIG. 21 is a block diagram showing a transmitter according to an embodiment of the invention.

FIG. 21 is a block diagram showing a transmitter according to an embodiment of the invention.

Referring to FIG. 21, a transmitter 500 includes a channel encoder 510, a bit masking unit 520, a scrambler 530, a mapper 540, and a modulator 550.

The channel encoder 510 receives a series of information bits and forms coded data by encoding the information bits in a predetermined coding scheme.

The bit masking unit 520 bit masks a scrambling code using a bit mask pattern to shift the phase of the scrambling code. The bit masking unit 520 recombines the scrambling code considering a constellation of a corresponding modulation scheme to shift a phase on the constellation. That is, the phase of a scrambling code itself is shifted to enhance diversity gain.

The scrambler 530 generates a scrambled code by scrambling the coded data using the phase shifted scrambling code. The mapper 540 maps the scrambled code to a data symbol representing a location on the signal constellation. The modulator 550 modulates the data symbol and transmits the modulated data symbol through a transmit antenna 590.

Figure 22:
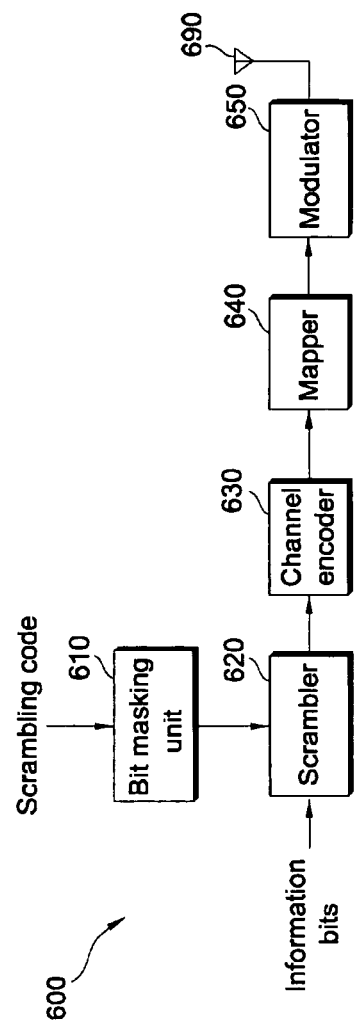
FIG. 22 is a block diagram showing a transmitter according to another embodiment of the invention.

FIG. 22 is a block diagram showing a transmitter according to another embodiment of the invention.

Referring to FIG. 22, a transmitter 600 includes a bit masking unit 610, a scrambler 620, a channel encoder 630, a mapper 640, and a modulator 650.

The bit masking unit 610 bit masks a scrambling code using a bit mask pattern to shift the phase of the scrambling code. The bit masking unit 610 recombines the scrambling code considering a constellation of a corresponding modulation scheme to shift a phase on the constellation. That is, the phase of a scrambling code itself is shifted to enhance a diversity gain.

The scrambler 620 generates a scrambled code by scrambling information bits using the phase shifted scrambling code. The channel encoder 630 receives the scrambled code and forms coded data by encoding the scrambled code in a predetermined coding scheme. The mapper 640 maps the scrambled code to a data symbol representing a location on the signal constellation. The modulator 650 modulates the data symbol and transmits the modulated data symbol through a transmit antenna 690.

Figure 23:
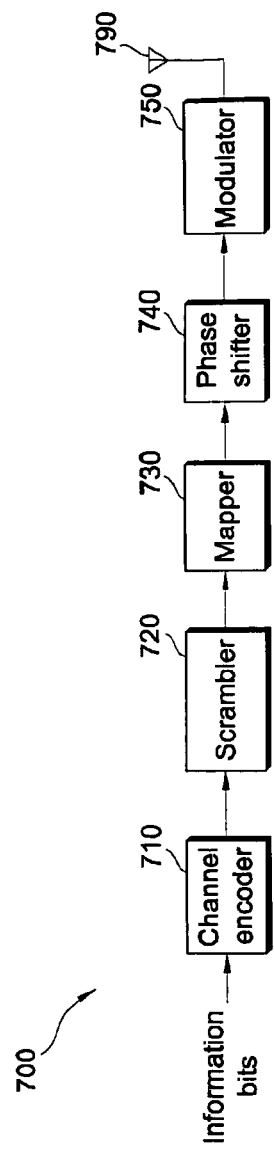
FIG. 23 is a block diagram showing a transmitter according to an embodiment of the invention.
Figure 24:
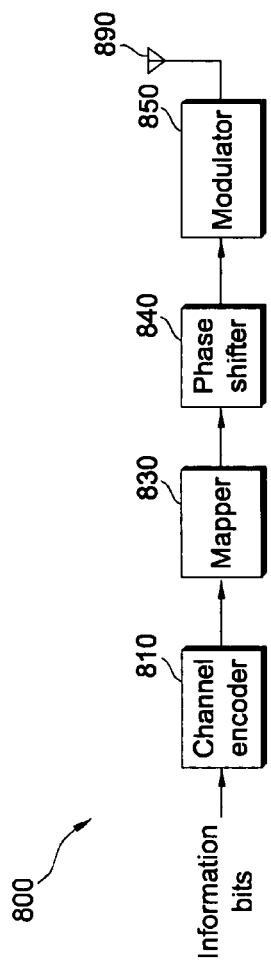
FIG. 24 is a block diagram showing a transmitter according to an embodiment of the invention.

FIG. 23 is a block diagram showing a transmitter according to an embodiment of the invention.

Referring to FIG. 23, a transmitter 700 includes a channel encoder 710, a scrambler 720, a mapper 730, a phase shifter 740, and a modulator 750.

The channel encoder 710 receives a series of information bits and forms coded data by encoding the information bits in a predetermined coding scheme. The scrambler 720 generates a scrambled code by scrambling the coded data using a scrambling code. The mapper 730 maps the scrambled code to a data symbol representing a location on the signal constellation. The phase shifter 740 shifts the phase of the data symbol. The modulator 750 modulates the data symbol and transmits the modulated data symbol through a transmit antenna 790. A phase can be shifted as much as arbitrary radians through a phase shift at a symbol level.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting data, by a transmitter, using hybrid automatic repeat request (HARM), the method comprising:

transmitting initial data to a receiver, the initial data being mapped on a signal constellation, wherein the initial data is scrambled by a scrambling code;

receiving a non-acknowledgement (NACK) signal for the initial data from the receiver, the NACK signal indicating that the receiver did not receive the initial data successfully;

generating retransmission data by shifting the phase of the initial data on the signal constellation, the phase of the initial data being shifted by performing bit masking on the initial data based on a bit masking pattern, wherein the phase of the initial data is shifted by $\pi$ radians using a bit masking pattern (−1,−1) in a QPSK signal constellation, a bit masking pattern (−1,−1,+1,+1) in a 16 QAM signal constellation, and a bit masking pattern (−1,−1,+1,+1,+1,+1) in a 64 QAM signal constellation, wherein the bit masking pattern is used for mitigating inter-cell interference and inter-symbol interference, wherein a diversity gain is obtained by changing a channel selectivity based on the phase shift performed using the bit masking pattern, and wherein a residual inter symbol interference (ISI) operating to each of a first user equipment and a second user equipment located in the same cell is canceled by the phase shift performed using the bit masking pattern; and transmitting the retransmission data to the receiver.

2. A method for allocating, by a base station, a scrambling code in a wireless communication system, the method comprising:

allocating a first scrambling code to a first user equipment;

allocating a second scrambling code to a second user equipment;

receiving first initial data from the first user equipment based on the first scrambling code, the first initial data being mapped on a signal constellation;

receiving second initial data from the second user equipment based on the second scrambling code, the second initial data being mapped on the signal constellation;

receiving first retransmission data from the first user equipment based on a first recombined scrambling code by applying a first bit masking to shift the phase of the first scrambling code on the signal constellation, wherein the first user equipment shifts the phase of the first initial data by $\pi$ radians using a bit masking pattern (−1,−1) in a QPSK signal constellation, a bit masking pattern (−1,−1,+1,+1) in a 16 QAM signal constellation, and a bit masking pattern (−1,−1,+1,+1,+1,+1) in a 64 QAM signal constellation; and receiving second retransmission data from the second user equipment based on a second recombined scrambling code by applying a second bit masking to shift the phase of the second scrambling code on the signal constellation, wherein the second user equipment shifts the phase of the second initial data by $\pi$ radians using a bit masking pattern (−1,−1) in a QPSK signal constellation, a bit masking pattern (−1,−1,+1,+1) in a 16 QAM signal constellation, and a bit masking pattern (−1,−1,+1,+1,+1,+1) in a 64 QAM signal constellation, and wherein the bit masking pattern is used for mitigating inter-cell interference and inter-symbol interference, wherein a diversity gain is obtained by changing a channel selectivity based on the phase shift performed using the bit masking pattern, and wherein a residual inter symbol interference (ISI) operating to each of the first user equipment and the second user equipment located in the same cell is canceled by the phase shift performed using the bit masking pattern.

* * * * *